(12) United States Patent
Kawakami et al.

(10) Patent No.: US 12,183,929 B2
(45) Date of Patent: Dec. 31, 2024

(54) ENERGY STORAGE DEVICE AND METHOD FOR MANUFACTURING THE SAME

(71) Applicant: GS Yuasa International Ltd., Kyoto (JP)

(72) Inventors: Satoru Kawakami, Kyoto (JP); Hironori Aida, Kyoto (JP); Koki Maeda, Kyoto (JP); Yudai Kato, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 844 days.

(21) Appl. No.: 17/281,897

(22) PCT Filed: Oct. 4, 2019

(86) PCT No.: PCT/JP2019/039225
§ 371 (c)(1),
(2) Date: Mar. 31, 2021

(87) PCT Pub. No.: WO2020/071516
PCT Pub. Date: Apr. 9, 2020

(65) Prior Publication Data
US 2021/0384513 A1   Dec. 9, 2021

(30) Foreign Application Priority Data
Oct. 5, 2018   (JP) ................. 2018-190054

(51) Int. Cl.
*H01M 4/64* (2006.01)
*H01M 4/04* (2006.01)
(Continued)

(52) U.S. Cl.
CPC .............. *H01M 4/64* (2013.01); *H01M 4/04* (2013.01); *H01M 50/538* (2021.01);
(Continued)

(58) Field of Classification Search
None
See application file for complete search history.

(56) References Cited

U.S. PATENT DOCUMENTS

| 2003/0118899 A1 | 6/2003 | Kometani et al. |
| 2012/0189899 A1 | 7/2012 | Kanda et al. |
| (Continued) | | |

FOREIGN PATENT DOCUMENTS

| JP | H07-183023 A | 7/1995 |
| JP | 2001-338632 A | 12/2001 |
| (Continued) | | |

OTHER PUBLICATIONS

International Search Report (ISR) (PCT Form PCT/ISA/210), in PCT/JP2019/039225, dated Dec. 17, 2019.

*Primary Examiner* — Alix E Eggerding
(74) *Attorney, Agent, or Firm* — MCGINN I.P. LAW GROUP, PLLC

(57) ABSTRACT

An energy storage device includes a positive electrode terminal, an electrode assembly, and a positive electrode current collector connecting the positive electrode terminal and the electrode assembly, in which the positive electrode current collector has a terminal connecting portion connected to the positive electrode terminal, an electrode connecting portion connected to the electrode assembly in the first direction, and an intermediate portion connecting the terminal connecting portion and the electrode connecting portion, the intermediate portion is arranged at a position overlapping the terminal connecting portion when viewed in the first direction, and the electrode connecting portion and the terminal connecting portion are arranged on one side of the intermediate portion in the first direction.

20 Claims, 7 Drawing Sheets

(51) Int. Cl.
*H01M 50/538* (2021.01)
*H01M 50/543* (2021.01)
*H01M 10/0525* (2010.01)
*H01M 50/531* (2021.01)

(52) U.S. Cl.
CPC ...... *H01M 50/543* (2021.01); *H01M 10/0525* (2013.01); *H01M 50/531* (2021.01)

(56) References Cited

U.S. PATENT DOCUMENTS

| | | | |
|---|---|---|---|
| 2012/0219845 A1 | 8/2012 | Chiba | |
| 2012/0308855 A1* | 12/2012 | Shimizu | H01M 50/533 |
| | | | 29/623.2 |
| 2015/0249237 A1* | 9/2015 | Naito | H01R 12/58 |
| | | | 429/7 |
| 2016/0049631 A1* | 2/2016 | Ogasawara | H01M 50/507 |
| | | | 429/121 |
| 2016/0336580 A1 | 11/2016 | Wakimoto et al. | |
| 2018/0062152 A1* | 3/2018 | Yoshida | H01M 50/533 |
| 2018/0269457 A1 | 9/2018 | Kawate et al. | |
| 2019/0067670 A1 | 2/2019 | Enomoto et al. | |
| 2019/0288270 A1 | 9/2019 | Wakimoto et al. | |
| 2020/0006719 A1* | 1/2020 | Ogawa | H01M 10/0587 |

FOREIGN PATENT DOCUMENTS

| | | | |
|---|---|---|---|
| JP | 2003-187779 A | | 7/2003 |
| JP | 2004-228044 A | | 8/2004 |
| JP | 2011-165475 A | | 8/2011 |
| JP | 2012-181941 A | | 9/2012 |
| JP | 2013-161757 A | | 8/2013 |
| JP | 2013-165012 A | | 8/2013 |
| JP | 5609935 B2 | | 10/2014 |
| JP | 2016-219123 A | | 12/2016 |
| JP | 2017-157354 | * | 9/2017 |
| JP | 2017-157354 A | | 9/2017 |
| JP | 2018-073630 A | | 5/2018 |
| JP | WO2017/047790 A1 | | 8/2018 |
| JP | 2018-147832 A | | 9/2018 |
| JP | 2019-067577 A | | 4/2019 |
| JP | 6522417 B2 | | 5/2019 |

* cited by examiner

ENERGY STORAGE DEVICE AND METHOD FOR MANUFACTURING THE SAME

TECHNICAL FIELD

The present invention relates to an energy storage device including an electrode terminal, an electrode assembly, and a current collector connecting the electrode terminal and the electrode assembly, and to a method for manufacturing the same.

BACKGROUND ART

Conventionally, an energy storage device including an electrode terminal, an electrode assembly, and a current collector connecting the electrode terminal and the electrode assembly is widely known. Patent Document 1 discloses a secondary battery (energy storage device) that is provided with an electrode terminal, a plurality of electrode plates (electrode assembly), and a plurality of stacked connection plates (current collector) having both ends joined to the electrode terminal and the plurality of electrode plates and electrically connecting the electrode terminal and the plurality of electrode plates to each other. The plurality of stacked connection plates are folded in a meandering shape between the electrode terminal and the plurality of electrode plates.

PRIOR ART DOCUMENT

Patent Document

Patent Document 1: JP-A-2011-165475

SUMMARY OF THE INVENTION

Problems to be Solved by the Invention

However, in the above-mentioned conventional energy storage device, energy density may decrease.

An object of the present invention is to provide an energy storage device capable of improving energy density and a method for manufacturing the same.

Means for Solving the Problems

An energy storage device according to one aspect of the present invention is an energy storage device including an electrode terminal, an electrode assembly, and a current collector connecting the electrode terminal and the electrode assembly, in which the current collector has a terminal connecting portion connected to the electrode terminal, an electrode connecting portion connected to the electrode assembly in a first direction, and an intermediate portion that connects the terminal connecting portion and the electrode connecting portion, the intermediate portion is arranged at a position overlapping the terminal connecting portion when viewed in the first direction, and the electrode connecting portion and the terminal connecting portion are arranged on one side of the intermediate portion in the first direction.

The present invention can be realized not only as such an energy storage device, but also as a current collector provided in the energy storage device, the current collector and a regulating portion, or a method for manufacturing the same.

Advantages of the Invention

According to the present invention, it is possible to provide an energy storage device or the like capable of improving the energy density.

MODE FOR CARRYING OUT THE INVENTION

Figure 1:
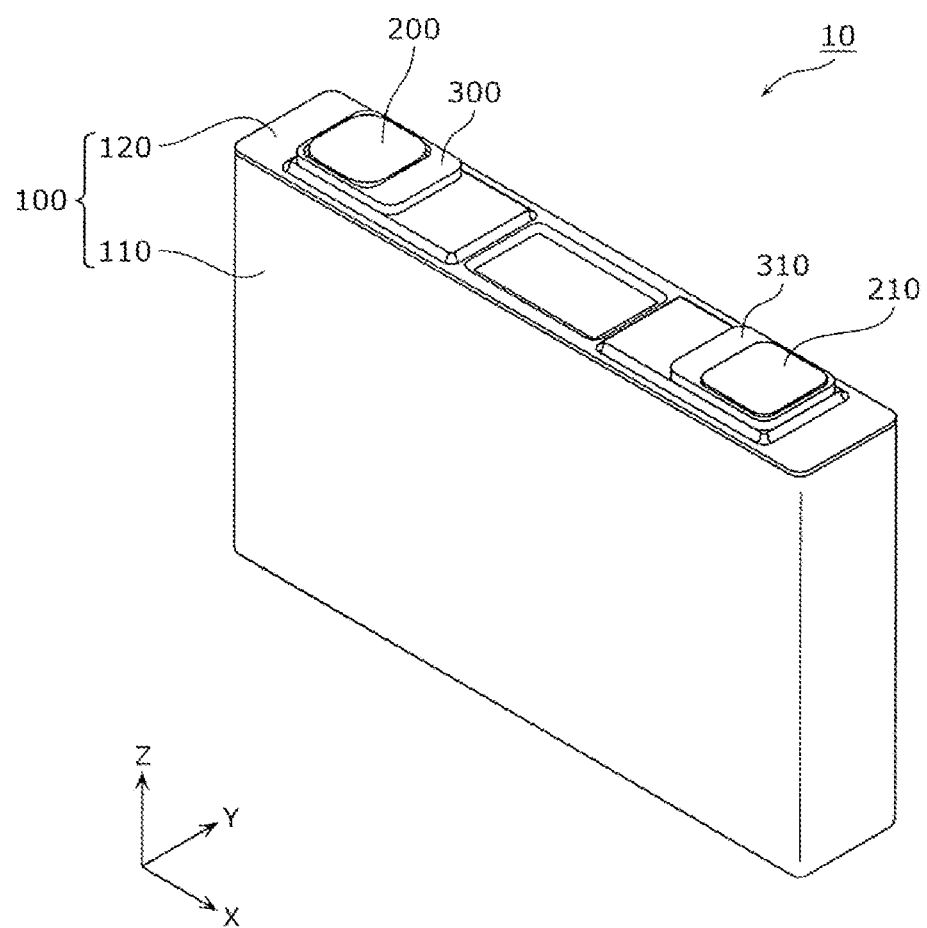
FIG. 1 is a perspective view showing an external appearance of an energy storage device according to an embodiment.

In the above-mentioned conventional energy storage device, the energy density may decrease. That is, in the above-mentioned conventional energy storage device, the current collector is folded in a meandering shape to connect the electrode terminal and the electrode assembly, so that the electrode assembly is arranged at a position away from the electrode terminal. As a result, the size of the electrode assembly is limited, so that the energy density decreases.

An energy storage device according to one aspect of the present invention is an energy storage device including an electrode terminal, an electrode assembly, and a current collector connecting the electrode terminal and the electrode assembly, in which the current collector has a terminal connecting portion connected to the electrode terminal, an electrode connecting portion connected to the electrode assembly in a first direction, and an intermediate portion that connects the terminal connecting portion and the electrode connecting portion, the intermediate portion is arranged at a position overlapping the terminal connecting portion when viewed in the first direction, and the electrode connecting portion and the terminal connecting portion are arranged on one side of the intermediate portion in the first direction.

According to the energy storage device, the current collector has a terminal connecting portion, an electrode connecting portion, and an intermediate portion, the intermediate portion is arranged at a position overlapping the terminal connecting portion when viewed in the first direction, and the electrode connecting portion and the terminal connecting portion are arranged on one side of the intermediate portion in the first direction. When the intermediate portion is arranged so as to be overlapped with the terminal connecting portion when viewed in the first direction, the electrode connecting portion may be arranged away from the terminal connecting portion in the first direction. If the electrode connecting portion is arranged away from the terminal connecting portion in the first direction, the electrode assembly is arranged at a position away from the electrode terminal in the first direction, and the size of the electrode assembly is limited. Therefore, the electrode connecting portion and the terminal connecting portion are arranged on one side of the intermediate portion in the first direction. As a result, the electrode assembly can be brought close to the electrode terminal in the first direction, so that a larger electrode assembly can be arranged and the energy density can be improved.

The electrode connecting portion may be arranged at a position that does not overlap the terminal connecting portion when viewed in the first direction.

According to this current collector, the electrode connecting portion is arranged at a position that does not overlap the terminal connecting portion when viewed in the first direction. By arranging the electrode connecting portion at a position that does not overlap the terminal connecting portion when viewed in the first direction in this way, it is possible to bring the electrode connecting portion close to the terminal connecting portion in the first direction. Therefore, since the electrode assembly can be brought close to the electrode terminal in the first direction, a larger electrode assembly can be arranged and the energy density can be improved.

The electrode connecting portion may be arranged in a second direction, intersecting with the first direction, of the intermediate portion, and the intermediate portion may be connected to an end portion of the terminal connecting portion in a third direction intersecting with the first direction and the second direction.

According to this current collector, the electrode connecting portion is arranged in the second direction of the intermediate portion, and the intermediate portion is connected to the end portion of the terminal connecting portion in the third direction. By arranging the electrode connecting portion in the second direction of the intermediate portion in this way, it is possible to bring the portion of the electrode connecting portion that does not overlap the intermediate portion when viewed in the first direction close to the terminal connecting portion in the first direction. Therefore, since the electrode assembly can be brought close to the electrode terminal in the first direction, a larger electrode assembly can be arranged. There is a case where it is easy to connect the electrode connecting portion to the electrode assembly by connecting the intermediate portion to the end portion of the terminal connecting portion in the third direction. This makes it possible to improve the energy density while facilitating the connection between the current collector and the electrode assembly.

The intermediate portion may have a bent portion that is bent or curved toward the electrode connecting portion at a connection part with the electrode connecting portion, and the bent portion may be arranged at a position overlapping the terminal connecting portion when viewed in the first direction.

According to this current collector, the intermediate portion has a bent portion at the connection part with the electrode connecting portion, and the bent portion is arranged at a position overlapping the terminal connecting portion. By overlapping the bent portion of the intermediate portion on the terminal connecting portion in this way, the intermediate portion has a shape that bends from the position of the terminal connecting portion, so that the size of the electrode connecting portion can be increased. As a result, the electrode assembly can be connected to the larger electrode connecting portion, so that the electrode assembly and the current collector can be connected more stably.

Further, a regulating portion may be provided that regulates at least one of the electrode connecting portion and the intermediate portion from moving in a direction away from the terminal connecting portion in the first direction.

According to this, the energy storage device includes a regulating portion that regulates at least one of the electrode connecting portion and the intermediate portion of the current collector from moving away from the terminal connecting portion in the first direction. In this way, by regulating at least one of the electrode connecting portion and the intermediate portion from being away from the terminal connecting portion in the first direction, it is possible to prevent the electrode assembly from receding from the electrode terminal in the first direction. As a result, the electrode assembly can be brought close to the electrode terminal in the first direction, so that a larger electrode assembly can be arranged and the energy density can be improved.

A method for manufacturing an energy storage device according to one aspect of the present invention manufactures an energy storage device including an electrode terminal, an electrode assembly, and a current collector connecting the electrode terminal and the electrode assembly, the current collector having a terminal connecting portion connected to the electrode terminal, an electrode connecting portion connected to the electrode assembly in a first direction, and an intermediate portion that connects the terminal connecting portion and the electrode connecting portion, the method for manufacturing the energy storage device including a bending step of bending the current collector so as to arrange the intermediate portion at a position overlapping the terminal connecting portion when viewed in the first direction, and arrange the electrode connecting portion and the terminal connecting portion on one side of the intermediate portion in the first direction.

According to the method for manufacturing an energy storage device, in the bending step, the current collector is bent so as to arrange the intermediate portion of the current collector at a position overlapping the terminal connecting portion of the current collector, and arrange the electrode connecting portion and the terminal connecting portion of the current collector on one side of the intermediate portion in the first direction. By arranging the electrode connecting portion on one side of the intermediate portion, the electrode assembly can be brought close to the electrode terminal, so that a larger electrode assembly can be arranged and the energy density can be improved.

In the bending step, the current collector is bent in two steps in the order of a first bending step and a second bending step, and in the first bending step, the terminal connecting portion may be brought close to the intermediate portion while supporting at least one of the electrode connecting portion and the intermediate portion from both sides in the first direction, and in the second bending step, the terminal connecting portion may be brought closer to the intermediate portion while supporting at least one of the electrode connecting portion and the intermediate portion from a side opposite to the terminal connecting portion in the first direction.

According to this, in the bending step, the current collector can be efficiently bent by bending the current collector in two steps in the order of the first bending step and the second bending step. As a result, it is possible to easily manufacture an energy storage device capable of improving the energy density.

Hereinafter, an energy storage device according to an embodiment (and a modification example thereof) of the present invention is described with reference to the drawings. The embodiments described below show comprehensive or specific examples. However, numerical values, shapes, materials, components, arrangement positions and connection modes of the components, manufacturing steps, order of manufacturing steps, and the like described in the following embodiments are only examples and are not intended to limit the present invention. In each drawing, dimensions and the like are not strictly shown.

In the following description and drawings, the arrangement direction of the pair (positive electrode side and negative electrode side) of electrode terminals of the energy storage device, the arrangement direction of the pair of current collectors, the arrangement direction of the pair of tab bundles of the electrode assembly, or the opposite direction of the short side surface of the case is defined as the X-axis direction. The opposite direction of the long side surface of the case, the short side direction of the short side surface of the case, the thickness direction of the case, or the laminating direction of the electrode plates of the electrode assembly is defined as the Y-axis direction. The arrangement direction of the electrode terminal, the current collector, and the electrode assembly, the arrangement direction of the case body and the lid of the energy storage device, the longitudinal direction of the short side surface of the case, or the vertical direction is defined as the Z-axis direction. These X-axis direction, Y-axis direction, and Z-axis direction are directions that intersect with each other (orthogonal in the present embodiment). Although the Z-axis direction may not be in the vertical direction depending on the usage mode, the Z-axis direction will be described below as the vertical direction for convenience of explanation. In the following description, the plus side in the X-axis direction indicates the arrow direction side of the X-axis, and the minus side in the X-axis direction indicates the side opposite to the plus side in the X-axis direction. The same applies to the Y-axis direction and the Z-axis direction.

Embodiment

1. General Description of Energy Storage Device

Figure 2:
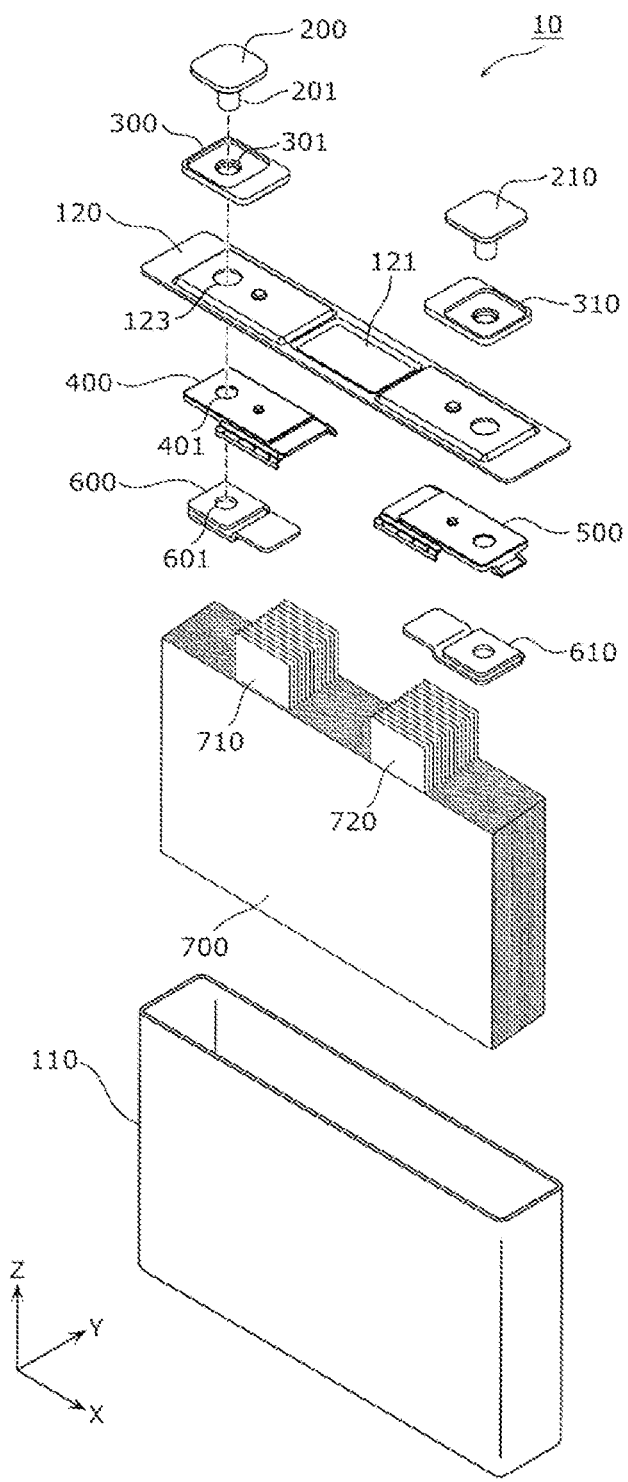
FIG. 2 is an exploded perspective view showing components when the energy storage device according to the embodiment is disassembled.

First, a general description of an energy storage device 10 according to the present embodiment will be given. FIG. 1 is a perspective view showing an external appearance of the energy storage device 10 according to the present embodiment. FIG. 2 is an exploded perspective view showing components when the energy storage device 10 according to the present embodiment is disassembled.

The energy storage device 10 is a secondary battery which can charge electricity or discharge electricity, more specifically, is a nonaqueous electrolyte secondary battery such as a lithium ion secondary battery. The energy storage device 10 is used as a battery or the like for driving or starting engine of a moving body, such as an automobile such as an electric vehicle (EV), a hybrid electric vehicle (HEV), or a plug-in hybrid electric vehicle (PHEV), a motorcycle, a watercraft, a snowmobile, an agricultural machine, or a construction machine.

The energy storage device 10 is not limited to a nonaqueous electrolyte secondary battery, and may be a secondary battery other than the nonaqueous electrolyte secondary battery or may be a capacitor. The energy storage device 10 may not be a secondary battery but may be a primary battery that can use electricity which is stored without the user having to charge the battery. Further, the energy storage device 10 may be a battery using a solid electrolyte. In the present embodiment, the rectangular parallelepiped (square) energy storage device 10 is illustrated, but the shape of the energy storage device 10 is not limited to the rectangular parallelepiped shape, and may be a polygonal column shape, a cylinder shape, a long cylinder shape, or the like other than the rectangular parallelepiped shape, or it may be a laminated type energy storage device.

As shown in FIG. 1, the energy storage device 10 includes a case 100, a positive electrode terminal 200, a negative electrode terminal 210, a positive electrode upper gasket 300, and a negative electrode upper gasket 310. As shown in FIG. 2, a positive electrode lower gasket 400, a negative electrode lower gasket 500, a positive electrode current collector 600, a negative electrode current collector 610, and an electrode assembly 700 are housed inside the case 100. An electrolyte solution (nonaqueous electrolyte) is sealed inside the case 100, but the figure is omitted. As the electrolyte solution, it is not particularly limited in type as long as it does not impair the performance of the energy storage device 10, and various ones can be selected. In addition to the above components, a spacer arranged on the side of or above the electrode assembly 700, an insulating film wrapping the electrode assembly 700 or the like, and the like may be arranged.

The case 100 is a rectangular parallelepiped (box-shaped) case composed of a case body 110 having a rectangular tubular shape and a bottom, and a lid 120 which is a plate-shaped member that closes an opening of the case body 110. The case 100 has a structure in which the electrode assembly 700 and the like are housed inside, and then the case body 110 and the lid 120 are, for example, welded to seal the inside. The material of the case 100 is not particularly limited, but is preferably a weldable metal such as stainless steel, aluminum, aluminum alloy, iron, and plated steel plate.

The lid 120 is provided with a gas release valve 121 that discharges the gas inside the case 100 when the internal pressure of the case 100 rises. The case 100 may have a liquid injection portion formed therein for injecting the electrolyte solution.

The electrode assembly 700 includes a positive electrode plate, a negative electrode plate, and a separator, and is an energy storage element (power generating element) capable of storing electricity. The positive electrode plate has a flat plate-shaped and rectangular positive electrode current collecting foil made of aluminum, an aluminum alloy, or the like, and a positive active material layer formed on the surface of the positive electrode current collecting foil. The negative electrode plate has a flat plate-shaped and rectangular negative electrode current collecting foil made of copper, a copper alloy, or the like, and a negative active material layer formed on the surface of the negative electrode current collecting foil. As the positive active material used for the positive active material layer and the negative active material used for the negative active material layer, known materials can be appropriately used as long as they can store and release lithium ions.

Both the positive electrode current collecting foil and the negative electrode current collecting foil have rectangular tabs protruding upward (plus side in the Z-axis direction). By laminating a plurality of positive electrode plates and a plurality of negative electrode plates with a separator interposed therebetween, a plurality of tabs is laminated on both the positive electrode plate and the negative electrode plate. As a result, the electrode assembly 700 is formed with a tab bundle 710 on the positive electrode side and a tab bundle 720 on the negative electrode side.

It was mentioned that the positive electrode plate and the negative electrode plate have a rectangular shape, but the shapes of the positive electrode plate and the negative electrode plate are not limited to the rectangular shape, and may be a polygonal shape, an oblong shape, an oval shape, or the like other than the rectangular shape. The tabs of the positive electrode plate and the negative electrode plate are not limited to the rectangular shape, and may have any shape such as a polygonal shape, a semicircular shape, a semi-oval shape, a semi-elliptical shape, or the like other than the rectangular shape. The laminated positive electrode plate and negative electrode plate may be fixed by arranging insulating tapes around the electrode assembly 700 or on both sides thereof in the X-axis direction and sandwiching them in the laminating direction (Y-axis direction). Alternatively, the positive electrode plate and the negative electrode plate may be fixed in the laminating direction by heat pressing or the like.

The positive electrode terminal 200 is an electrode terminal electrically connected to the positive electrode plate of the electrode assembly 700 via the positive electrode current collector 600. The negative electrode terminal 210 is an electrode terminal electrically connected to the negative electrode plate of the electrode assembly 700 via the negative electrode current collector 610. That is, the positive electrode terminal 200 and the negative electrode terminal 210 are metal electrode terminals for leading the electricity stored in the electrode assembly 700 to the external space of the energy storage device 10, and for introducing the electricity into the internal space of the energy storage device 10 to store the electricity in the electrode assembly 700. The positive electrode terminal 200 and the negative electrode terminal 210 are connected to the positive electrode current collector 600 and the negative electrode current collector 610, respectively, by swaging or the like, and are attached to the lid 120.

Specifically, the positive electrode terminal 200 has a cylindrical shaft portion 201 (rivet portion) extending downward (minus side in the Z-axis direction). The shaft portion 201 is inserted through a circular through hole 301 of the positive electrode upper gasket 300, a circular through hole 123 of the lid 120, a circular through hole 401 of the positive electrode lower gasket 400, and a circular through hole 601 of the positive electrode current collector 600, and is swaged. As a result, the positive electrode terminal 200 is fixed to the lid 120 together with the positive electrode upper gasket 300, the positive electrode lower gasket 400, and the positive electrode current collector 600. The same applies to the negative electrode side. The positive electrode terminal 200 and the negative electrode terminal 210 are made of aluminum, an aluminum alloy, copper, a copper alloy, or the like.

The positive electrode current collector 600 is a flat plate-shaped conductive member that electrically connects the positive electrode plate of the electrode assembly 700 and the positive electrode terminal 200. The negative electrode current collector 610 is a flat plate-shaped conductive member that electrically connects the negative electrode plate of the electrode assembly 700 and the negative electrode terminal 210. Specifically, the positive electrode current collector 600 is joined to the tab bundle 710 on the positive electrode side of the electrode assembly 700 by welding or the like, and is joined to the positive electrode terminal 200 by swaging or the like as described above. The negative electrode current collector 610 is joined to the tab bundle 720 on the negative electrode side of the electrode assembly 700 by welding or the like, and is joined to the negative electrode terminal 210 by swaging or the like as described above. The positive electrode current collector 600 is made of aluminum, an aluminum alloy, or the like, and the negative electrode current collector 610 is made of copper, a copper alloy, or the like.

The positive electrode current collector 600 and the negative electrode current collector 610 are arranged between the electrode assembly 700 and the lid 120 of the case 100. Specifically, the positive electrode current collector 600 is arranged between the tab bundle 710 on the positive electrode side of the electrode assembly 700 and the positive electrode lower gasket 400, and the negative electrode current collector 610 is arranged between the tab bundle 720 on the negative electrode side of the electrode assembly 700 and the negative electrode lower gasket 500 That is, the positive electrode current collector 600 is arranged at a position sandwiching the positive electrode lower gasket 400 with the lid 120, and the negative electrode current collector 610 is arranged at a position sandwiching the negative electrode lower gasket 500 with the lid 120. The detailed description of the configurations of the positive electrode current collector 600 and the negative electrode current collector 610 will be described later.

The positive electrode upper gasket 300 is a flat plate-shaped electrically insulating sealing member arranged between the lid 120 of the case 100 and the positive electrode terminal 200. The negative electrode upper gasket 310 is a flat plate-shaped electrically insulating sealing member arranged between the lid 120 of the case 100 and the negative electrode terminal 210. Specifically, the positive electrode upper gasket 300 is formed so as to cover the lower portion and the side portion of the positive electrode terminal 200, and the negative electrode upper gasket 310 is formed so as to cover the lower portion and the side portion of the negative electrode terminal 210.

The positive electrode lower gasket 400 is a flat plate-shaped electrically insulating sealing member arranged between the lid 120 and the positive electrode current collector 600. The negative electrode lower gasket 500 is a flat plate-shaped electrically insulating sealing member arranged between the lid 120 and the negative electrode current collector 610.

The positive electrode upper gasket 300, the negative electrode upper gasket 310, the positive electrode lower gasket 400, and the negative electrode lower gasket 500 are made of resin or the like, such as polypropylene (PP), polyethylene (PE), polyphenylene sulfide resin (PPS), polyethylene terephthalate (PET), polyether ether ketone (PEEK), tetrafluoroethylene/perfluoroalkyl vinyl ether (PFA), polytetrafluoroethylene (PTFE), polybutylene terephthalate (PBT), poly ether sulfone (PES), and composite materials thereof.

2 Explanation of Configurations of Positive Electrode Current Collector and Negative Electrode Current Collector Next, the configurations of the positive electrode current collector 600 and the negative electrode current collector 610 will be described in detail. Since the positive electrode current collector 600 and the negative electrode current collector 610 have the same configuration (shape symmetrical with respect to the YZ plane), the positive electrode current collector 600 will be described in detail below, and the description of the negative electrode current collector 610 will be simplified or omitted.

Figure 3:
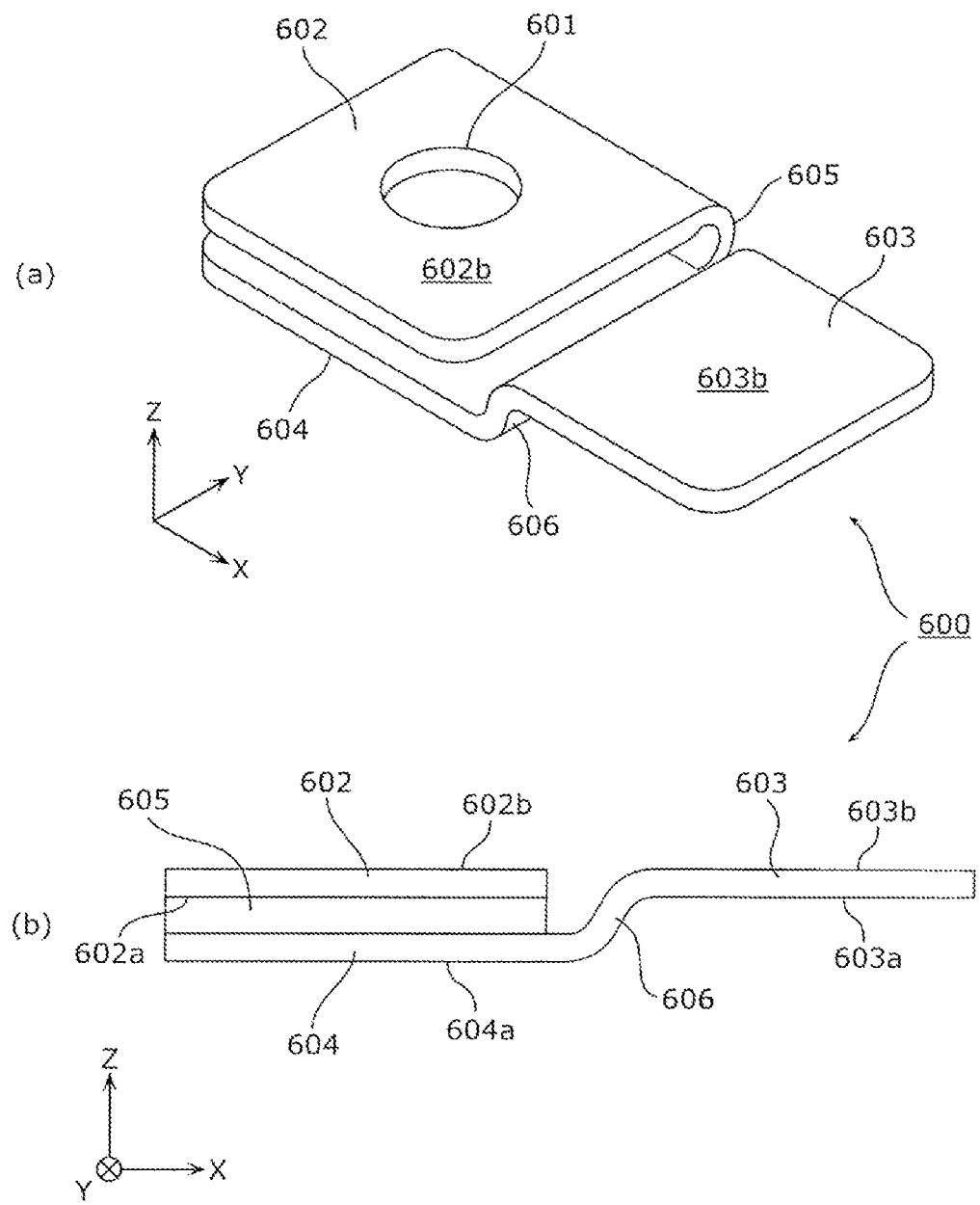
FIG. 3 is a perspective view and a front view showing a configuration of a positive electrode current collector according to the embodiment.
Figure 4:
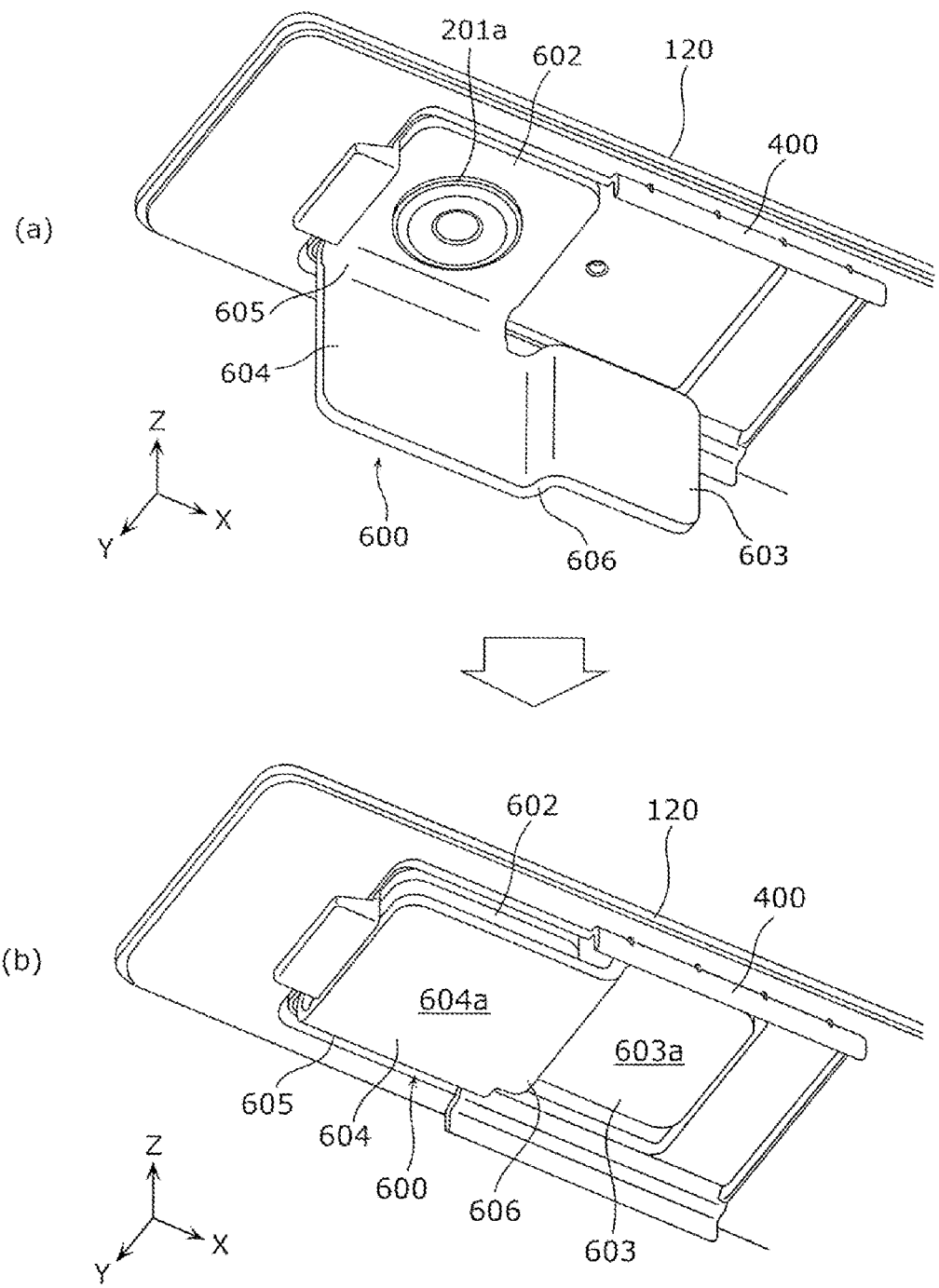
FIG. 4 is a perspective view showing a connection configuration of the positive electrode current collector, a positive electrode terminal, and an electrode assembly according to the embodiment.

FIG. 3 is a perspective view and a front view showing the configuration of the positive electrode current collector 600 according to the present embodiment. Specifically, (a) of FIG. 3 is a perspective view when the positive electrode current collector 600 is viewed from diagonally above, that is, an enlarged perspective view showing the positive electrode current collector 600 shown in FIG. 2 in an enlarged manner. (b) of FIG. 3 is a front view when the positive electrode current collector 600 shown in (a) of FIG. 3 is viewed from the minus side in the Y-axis direction. FIG. 4 is a perspective view showing a connection configuration of the positive electrode current collector 600, the positive electrode terminal 200, and the electrode assembly 700 according to the present embodiment. Specifically, (a) of FIG. 4 is a perspective view when the configuration of the positive electrode current collector 600 in a state where the terminal connecting portion 602 and the positive electrode terminal 200 are connected is viewed from diagonally below. (b) of FIG. 4 is a perspective view when the configuration of the positive electrode current collector 600 in a state where the electrode connecting portion 603 and the tab bundle 710 of the electrode assembly 700 are connected is viewed from diagonally below. In (b) of FIG. 4, the electrode assembly 700 is omitted for convenience of explanation.

The positive electrode current collector 600 is a member having one end connected to the positive electrode terminal 200 and the other end connected to the electrode assembly 700. Specifically, as shown in FIG. 3, the positive electrode current collector 600 includes the terminal connecting portion 602 connected to the positive electrode terminal 200, the electrode connecting portion 603 connected to the electrode assembly 700, and the intermediate portion 604 arranged between the terminal connecting portion 602 and the electrode connecting portions 603. That is, one L-shaped flat plate-shaped member is bent to form the positive electrode current collector 600 having the terminal connecting portion 602, the intermediate portion 604, and the electrode connecting portion 603.

The terminal connecting portion 602 is a rectangular and flat plate-shaped portion connected (joined) to the positive electrode terminal 200 by swaging or the like, and is arranged parallel to the XY plane. That is, as described above, the terminal connecting portion 602 has a through hole 601, and the shaft portion 201 of the positive electrode terminal 200 is inserted into the through hole 601 in a state of being directed to the Z-axis direction (hereinafter, also referred to as the first direction) (facing the Z-axis direction). As shown in (a) of FIG. 4, the end portion of the shaft portion 201 on the minus side in the Z-axis direction is swaged to form a swaged portion 201a, and the positive electrode terminal 200 and the terminal connecting portion 602 are joined in the Z-axis direction. The method for connecting (joining) the terminal connecting portion 602 and the positive electrode terminal 200 is not limited to swaging joining, and ultrasonic bonding, welding such as laser welding or resistance welding, or mechanical joining other than swaging such as screw fastening, or the like may be used.

Returning to FIG. 3, the electrode connecting portion 603 is a rectangular and flat plate-shaped portion connected (joined) to the tab bundle 710 of the electrode assembly 700 by welding or the like, and is arranged parallel to the XY plane. Specifically, in a state where the intermediate portion 604 and the electrode connecting portion 603 are directed to the Y-axis direction (facing the Y-axis direction) shown in (a) of FIG. 4, the tab bundle 710 (not shown) of the electrode assembly 700 is joined by welding to an electrode connecting portion first surface 603a, which is a surface of the electrode connecting portion 603 on the plus side in the Y-axis direction. Welding is performed with the tab bundle 710 sandwiched between the electrode connecting portion first surface 603a and a backing plate (not shown). As shown in (b) of FIG. 4, the intermediate portion 604 and the electrode connecting portion 603 are bent to the minus side in the Y-axis direction. As a result, the electrode connecting portion first surface 603a becomes a surface on the minus side in the Z-axis direction, and the electrode connecting portion 603, in a state of being directed to the Z-axis direction (facing the Z-axis direction), is joined to the tab bundle 710 of the electrode assembly 700 in the Z-axis direction (first direction).

In other words, the tab bundle 710 of the electrode assembly 700 is joined to the electrode connecting portion first surface 603a in a state of being extended in the Z-axis direction, and after joining, is bent in the Y-axis direction and extended in the Y-axis direction. The method for connecting (joining) the electrode connecting portion 603 and the tab bundle 710 of the electrode assembly 700 may use any welding such as ultrasonic bonding, laser welding, or resistance welding, or may use mechanical joining such as swaging joining or screw fastening.

Returning to FIG. 3, the intermediate portion 604 is a substantially rectangular and substantially flat plate-shaped portion connecting the terminal connecting portion 602 and the electrode connecting portion 603, and is arranged parallel to the XY plane. Specifically, the intermediate portion 604 is arranged on the minus side in the Z-axis direction of the terminal connecting portion 602 and on the minus side in the X-axis direction of the electrode connecting portion 603. That is, the intermediate portion 604 is arranged at a position overlapping the terminal connecting portion 602 when viewed in the Z-axis direction (first direction), and is arranged so as to be aligned with the electrode connecting portion 603 in the X-axis direction. The intermediate portion 604 has a connection part 605 with the terminal connecting portion 602 and a connection part 606 with the electrode connecting portion 603.

The connection part 605 is connected to the end portion of the terminal connecting portion 602 on the plus side in the Y-axis direction, and is a portion curved so as to have a convex shape on the plus side in the Y-axis direction and having a U-shaped cross-sectional shape on the YZ plane. That is, as described above, the connection part 605 is a bent portion formed by bending the intermediate portion 604 with respect to the terminal connecting portion 602, and is formed to be thinner than the other portion of the intermediate portion 604 and the terminal connecting portion 602 so that the connection part 605 is easily bent. Specifically, the connection part 605 is formed by bending the intermediate portion 604 to the minus side in the Z-axis direction and the minus side in the Y-axis direction with respect to the terminal connecting portion 602. As a result, the intermediate portion 604 is connected to the end portion of the terminal connecting portion 602 on the plus side in the Y-axis direction (hereinafter, also referred to as the third direction), and is arranged on the minus side in the Z-axis direction of the terminal connecting portion 602. The connection part 605 may be a bent portion rather than a curved portion.

The connection part 606 is connected to the end portion of the electrode connecting portion 603 on the minus side in the X-axis direction, and is a portion inclined to the minus side in the Z-axis direction toward the minus side in the X-axis direction and having a substantially S-shaped cross-sectional shape on the XZ plane. That is, the connection part 606 is an inclined portion formed by bending the intermediate portion 604 twice to the minus side in the Z-axis direction and the minus side in the X-axis direction with respect to the electrode connecting portion 603. As a result, the intermediate portion 604 is arranged on the minus side in the X-axis direction and the minus side in the Z-axis direction of the electrode connecting portion 603.

In other words, the electrode connecting portion 603 is arranged on the plus side in the X-axis direction (hereinafter, also referred to as a second direction) of the intermediate portion 604. Specifically, the electrode connecting portion 603 is arranged on the plus side in the X-axis direction with respect to the intermediate portion 604 and the terminal connecting portion 602. That is, the electrode connecting portion 603 is arranged at a position that does not overlap the intermediate portion 604 and the terminal connecting portion 602 when viewed from the Z-axis direction (first direction). The electrode connecting portion 603 and the terminal connecting portion 602 are arranged on one side (plus side in the Z-axis direction) of the intermediate portion 604 in the Z-axis direction (first direction). It can be also said that the electrode connecting portion 603 is arranged closer to the terminal connecting portion 602 than the intermediate portion 604 in the Z-axis direction (first direction). That is, the electrode connecting portion 603 is arranged at a position closer to the terminal connecting portion 602 or the lid 120 (or a position closer to the positive electrode lower gasket 400) than the intermediate portion 604 in the Z-axis direction (first direction). In the present embodiment, the electrode connecting portion 603 is arranged at the same position as the terminal connecting portion 602 in the Z-axis direction.

Specifically, the electrode connecting portion first surface 603a, which is a surface of the electrode connecting portion 603 on the minus side in the Z-axis direction, is arranged closer to the plus side in the Z-axis direction than an intermediate portion first surface 604a, which is a surface of the intermediate portion 604 on the minus side in the Z-axis direction. That is, the electrode connecting portion first surface 603a is arranged on the same plane (the same position in the Z-axis direction) as a terminal connecting portion first surface 602a, which is a surface of the terminal connecting portion 602 on the minus side in the Z-axis direction. An electrode connecting portion second surface 603b, which is a surface of the electrode connecting portion 603 on the plus side in the Z-axis direction, is arranged on the same plane (the same position in the Z-axis direction) as a terminal connecting portion second surface 602b, which is a surface of the terminal connecting portion 602 on the plus side in the Z-axis direction.

Since the electrode connecting portion 603 is arranged closer to the minus side in the Z-axis direction or the plus side in the Z-axis direction than the terminal connecting portion 602, the electrode connecting portion first surface 603a may be arranged closer to the minus side in the Z-axis direction or the plus side in the Z-axis direction than the terminal connecting portion first surface 602a. Alternatively, since the electrode connecting portion 603 has a thickness different from that of the terminal connecting portion 602, the electrode connecting portion first surface 603a may be arranged closer to the minus side in the Z-axis direction or the plus side in the Z-axis direction than the terminal connecting portion first surface 602a. Similarly, the electrode connecting portion second surface 603b may also be arranged closer to the minus side in the Z-axis direction or the plus side in the Z-axis direction than the terminal connecting portion second surface 602b.

Figure 5:
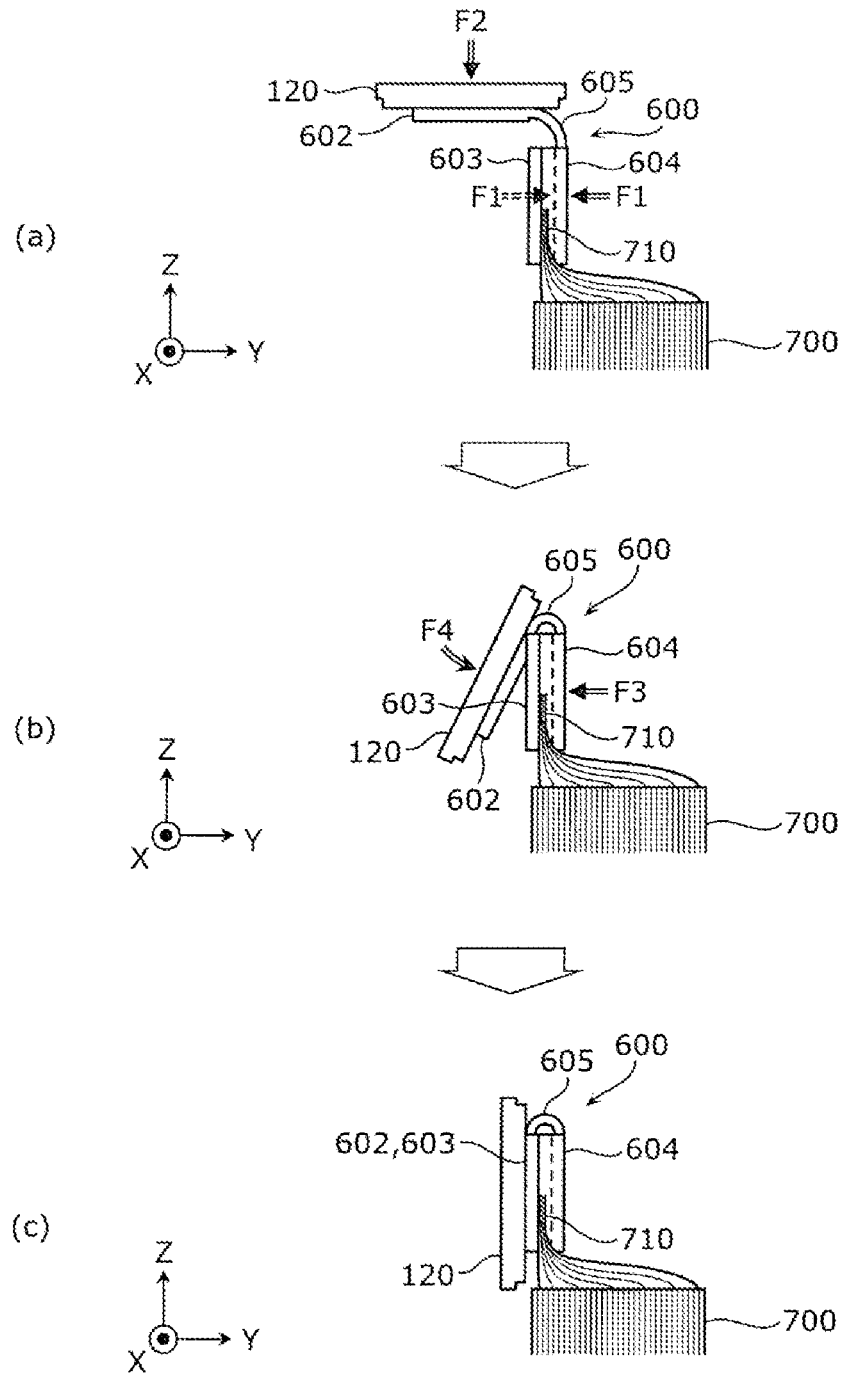
FIG. 5 is a diagram illustrating a method for manufacturing an energy storage device (bending step of the positive electrode current collector) according to the embodiment.

Next, a method for manufacturing the energy storage device 10 (bending step of the positive electrode current collector 600) will be described. FIG. 5 is a diagram illustrating a method for manufacturing the energy storage device 10 (bending step of the positive electrode current collector 600) according to the present embodiment. Specifically, (a) of FIG. 5 is a side view showing a state before the positive electrode current collector 600 is bent, (b) of FIG. 5 is a side view showing a state in the middle of bending the positive electrode current collector 600, and (c) of FIG. 5 is a side view showing a state after the positive electrode current collector 600 is bent. In the above, the Z-axis direction is also referred to as the first direction, but in the bending step of the positive electrode current collector 600 shown in FIG. 5, the Y-axis direction is also referred to as the first direction. In FIG. 5, for convenience of explanation, the positive electrode terminal 200, the positive electrode upper gasket 300, and the positive electrode lower gasket 400 are not shown, and the lid 120, the positive electrode current collector 600, and the electrode assembly 700 are schematically shown.

As shown in (a) of FIG. 5, in a state where the terminal connecting portion 602 of the positive electrode current collector 600 and the electrode connecting portion 603 and the intermediate portion 604 are orthogonal to each other, the terminal connecting portion 602 is joined to the lid 120, and the electrode connecting portion 603 is joined to the tab bundle 710 of the electrode assembly 700. In this state, as the first bending step, the terminal connecting portion 602 is brought close to the intermediate portion 604 while supporting at least one of the electrode connecting portion 603 and the intermediate portion 604 from both sides in the Y-axis direction (first direction). In the present embodiment, the intermediate portion 604 is supported by being pressed by a force F1 from both sides in the Y-axis direction with a jig or the like. By pushing the terminal connecting portion 602 to the minus side in the Z-axis direction with a force F2 to bend the connection part 605, the terminal connecting portion 602 is rotated around the connection part 605 and brought close to the intermediate portion 604. Instead of or in addition to the intermediate portion 604, the electrode connecting portion 603 may be supported from both sides in the Y-axis direction.

In this way, as shown in (b) of FIG. 5, the connection part 605 is bent so that the terminal connecting portion 602 rotates about 50° to 70° until the amount of springback caused by the connection part 605 exceeds a peak to bring the terminal connecting portion 602 close to the intermediate portion 604. Then, as the second bending step, the terminal connecting portion 602 is brought closer to the intermediate portion 604 while supporting at least one of the electrode connecting portion 603 and the intermediate portion 604 from the side opposite to the terminal connecting portion 602 in the Y-axis direction (first direction). In the present embodiment, the intermediate portion 604 is supported by being pressed by a force F3 from the plus side in the Y-axis direction with a jig or the like. By pushing the terminal connecting portion 602 to the plus side in the Y-axis direction with a force F4 to further bend the connection part 605, the terminal connecting portion 602 is rotated around the connection part 605 to be brought closer to the intermediate portion 604. Instead of or in addition to the intermediate portion 604, the electrode connecting portion 603 may be supported from the plus side in the Y-axis direction.

As a result, as shown in (c) of FIG. 5, the terminal connecting portion 602 is in a state of being directed to the Y-axis direction (facing the Y-axis direction), in other words, in a state of being parallel to the electrode connecting portion 603 and the intermediate portion 604. In this state, the intermediate portion 604 is arranged at a position overlapping the terminal connecting portion 602 when viewed in the Y-axis direction, and the electrode connecting portion 603 and the terminal connecting portion 602 are arranged on one side (minus side in the Y-axis direction) of the intermediate portion 604 in the Y-axis direction. That is, in the bending step, the positive electrode current collector 600 is bent in two steps in the order of the first bending step and the second bending step. In this bending step, the positive electrode current collector 600 is bent so as to arrange the intermediate portion 604 at a position overlapping the terminal connecting portion 602 when viewed in the Y-axis direction (first direction), and arrange the electrode connecting portion 603 and the terminal connecting portion 602 on one side (minus side in the Y-axis direction) of the intermediate portion 604 in the Y-axis direction (first direction). It can be also said that the positive electrode current collector 600 is bent so as to arrange the electrode connecting portion 603 closer to the terminal connecting portion 602 than the intermediate portion 604 in the Y-axis direction (first direction).

After that, the positive electrode current collector 600 is tilted to the plus side in the Y-axis direction together with the lid 120 (the tab bundle 710 is bent), and turned into a state of being directed to the Z-axis direction as shown in (b) of FIG. 4. In this way, since the positive electrode current collector 600 changes from the state of being directed to the Y-axis direction to the state of being directed to the Z-axis direction, the definition of the first direction also changes from the Y-axis direction to the Z-axis direction. The above forces F1 to F4 may be any value as long as the positive electrode current collector 600 can be bent as described above, and are appropriately determined according to the material or the like of the positive electrode current collector 600.

3 Description of Effects

As described above, according to the energy storage device 10 according to the embodiment of the present invention, the positive electrode current collector 600 has the terminal connecting portion 602, the electrode connecting portion 603, and the intermediate portion 604, the intermediate portion 604 is arranged at a position overlapping the terminal connecting portion 602 when viewed in the first direction (Z-axis direction), and the electrode connecting portion 603 and the terminal connecting portion 602 are arranged on one side of the intermediate portion 604 in the first direction. When the intermediate portion 604 is arranged so as to overlap the terminal connecting portion 602 when viewed in the first direction, the electrode connecting portion 603 may be arranged away from the terminal connecting portion 602 in the first direction. If the electrode connecting portion 603 is arranged away from the terminal connecting portion 602 in the first direction, the electrode assembly 700 is arranged at a position away from the positive electrode terminal 200 in the first direction, and the size of the electrode assembly 700 is limited. Therefore, the electrode connecting portion 603 and the terminal connecting portion 602 are arranged on one side of the intermediate portion 604 in the first direction. As a result, since the electrode assembly 700 can be brought close to the positive electrode terminal 200 in the first direction, a larger electrode assembly 700 can be arranged, and the energy density can be improved.

In the positive electrode current collector 600, the electrode connecting portion 603 is arranged at a position that does not overlap the terminal connecting portion 602 when viewed in the first direction. By arranging the electrode connecting portion 603 at a position that does not overlap the terminal connecting portion 602 when viewed in the first direction in this way, it is possible to bring the electrode connecting portion 603 close to the terminal connecting portion 602 in the first direction. Therefore, since the electrode assembly 700 can be brought close to the positive electrode terminal 200 in the first direction, a larger electrode assembly 700 can be arranged, and the energy density can be improved.

In the positive electrode current collector 600, the electrode connecting portion 603 is arranged in the second direction (plus side in the X-axis direction) of the intermediate portion 604, and the intermediate portion 604 is connected to the end portion of the terminal connecting portion 602 in the third direction (plus side in the Y-axis direction). By arranging the electrode connecting portion 603 in the second direction of the intermediate portion 604 in this way, it is possible to bring the portion of the electrode connecting portion 603, which does not overlap the intermediate portion 604 when viewed in the first direction, close to the terminal connecting portion 602 in the first direction. Therefore, the electrode assembly 700 can be brought close to the positive electrode terminal 200 in the first direction.

By connecting the intermediate portion 604 to the end portion of the terminal connecting portion 602 in the third direction, it is possible to easily connect the electrode connecting portion 603 to the electrode assembly 700. That is, when the intermediate portion 604 is connected to the end portion of the terminal connecting portion 602 on the minus side in the X-axis direction, it is necessary to twist the tab bundle 710 by 90° when the tab bundle 710 of the electrode assembly 700 is connected to the electrode connecting portion 603 in a state where the intermediate portion 604 is opened 90° in an L shape with respect to the terminal connecting portion 602. On the other hand, by connecting the intermediate portion 604 to the end portion of the terminal connecting portion 602 in the third direction, it is not necessary to twist the tab bundle 710 by 90° even in a state where the intermediate portion 604 is opened 90° with respect to the terminal connecting portion 602, and therefore, the tab bundle 710 can be easily connected to the electrode connecting portion 603. As a result, a larger electrode assembly 700 can be arranged while facilitating the connection between the current collector 600 and the electrode assembly 700, and the energy density can be improved.

The positive electrode current collector 600 has a structure in which a plate-shaped member is bent, and the position of the electrode connecting portion 603 with respect to the terminal connecting portion 602 can be arbitrarily moved to some extent via the intermediate portion 604.

Therefore, since the degree of freedom in the position of the electrode connecting portion 603 is high, the connection between the electrode connecting portion 603 and the electrode assembly 700 can be easily performed. Further, since the electrode connecting portion 603 can be brought close to the electrode assembly 700, the protruding length of the tab bundle 710 can be shortened. If the protruding length of the tab bundle 710 can be shortened, the space occupied by the tab bundle 710 in the case 100 is reduced, so that a larger electrode assembly 700 can be arranged, and the energy density can be improved.

In the method for manufacturing the energy storage device 10, in the bending step, the positive electrode current collector 600 is bent so as to arrange the intermediate portion 604 of the positive electrode current collector 600 at a position overlapping the terminal connecting portion 602 of the positive electrode current collector 600, and arrange the electrode connecting portion 603 and the terminal connecting portion 602 of the positive electrode current collector 600 on one side of the intermediate portion 604 in the first direction. By arranging the electrode connecting portion 603 on the one side of the intermediate portion 604, it is possible to bring the electrode assembly 700 close to the positive electrode terminal 200, so that a larger electrode assembly 700 can be arranged, and the energy density can be improved.

In the bending step, since the positive electrode current collector 600 is bent in two steps in the order of the first bending step and the second bending step, the positive electrode current collector 600 can be efficiently bent. As a result, the energy storage device 10 capable of improving the energy density can be easily manufactured.

Although the effect on the configuration on the positive electrode side (positive electrode current collector 600 side) has been described above, the same effect can be obtained also on the configuration on the negative electrode side (negative electrode current collector 610 side). The same applies to the following.

4 Description of Modification Example

First Modification Example

Figure 6:
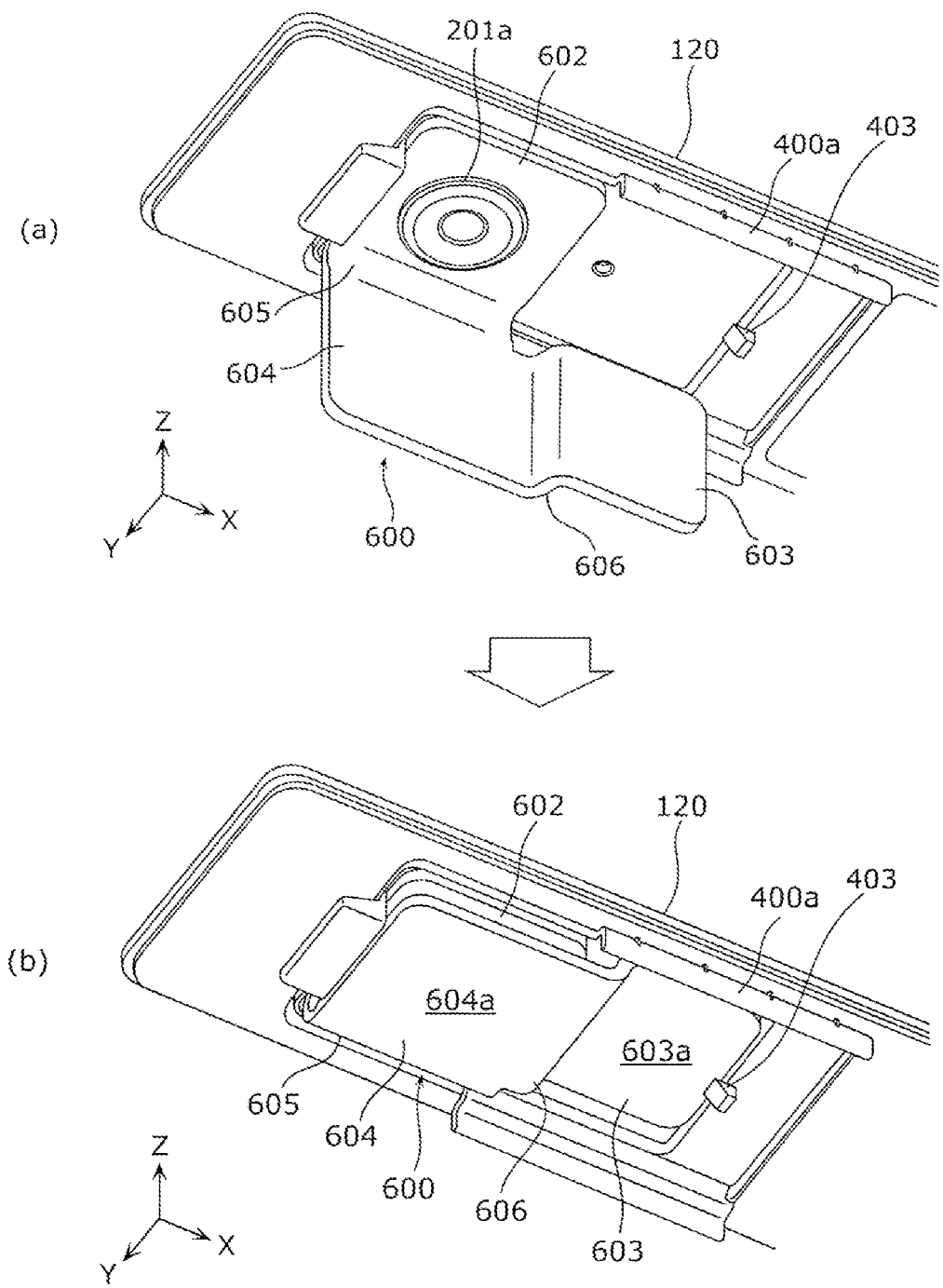
FIG. 6 is a perspective view showing a connection configuration of a positive electrode current collector, a positive electrode terminal, and an electrode assembly according to a first modification example of the embodiment.

Next, a first modification example of the above embodiment will be described. FIG. 6 is a perspective view showing a connection configuration of the positive electrode current collector 600, the positive electrode terminal 200, and the electrode assembly 700 according to the first modification example of the present embodiment. Specifically, (a) of FIG. 6 is a diagram corresponding to (a) of FIG. 4, and (b) of FIG. 6 is a diagram corresponding to (b) of FIG. 4.

As shown in FIG. 6, in this modification example, a positive electrode lower gasket 400a is arranged instead of the positive electrode lower gasket 400 in the above embodiment. Specifically, the positive electrode lower gasket 400a in the present modification example has a regulating portion 403 in addition to the configuration of the positive electrode lower gasket 400 in the above embodiment. Other configurations are the same as those in the above embodiment.

The regulating portion 403 is a portion that regulates at least one of the electrode connecting portion 603 and the intermediate portion 604 of the positive electrode current collector 600 from moving in a direction away from the terminal connecting portion 602 (minus side in the Z-axis direction) in the Z-axis direction (first direction).

Specifically, as shown in (a) of FIG. 6, the regulating portion 403 is a protrusion (claw) that is provided on a surface on the minus side in the Z-axis direction of a portion of the positive electrode lower gasket 400a on the plus side in the X-axis direction and protrudes toward the minus side in the X-axis direction. As shown in (b) of FIG. 6, the regulating portion 403 is arranged on the minus side in the Z-axis direction of the end portion of the electrode connecting portion 603 on the plus side in the X-axis direction when the electrode connecting portion 603 and the intermediate portion 604 are bent with respect to the terminal connecting portion 602. As a result, the regulating portion 403 engages with the end portion of the electrode connecting portion 603 on the plus side in the X-axis direction, and regulates the electrode connecting portion 603 from moving in a direction (minus side in the Z-axis direction) away from the terminal connecting portion 602 in the Z-axis direction (first direction).

The regulating portion 403 may be arranged at the end portion of the electrode connecting portion 603 on the plus side in the Y-axis direction or on the minus side in the Y-axis direction, or may be arranged at the end portion of the intermediate portion 604 on the minus side in the X-axis direction or on the minus side in the Y-axis direction. Alternatively, the positive electrode lower gasket 400a may have a plurality of regulating portions 403 arranged at any of these end portions.

From the viewpoint of effectively regulating the movement of the electrode connecting portion 603, the regulating portion 403 is preferably arranged at the end portion of the electrode connecting portion 603 on the plus side in the X-axis direction or on the minus side in the Y-axis direction. From the viewpoint of suppressing damage to the tab bundle 710 joined to the electrode connecting portion 603, the regulating portion 403 is preferably arranged at the end portion of the intermediate portion 604 on the minus side in the X-axis direction or on the minus side in the Y-axis direction. From the viewpoint of effectively suppressing the electrode connecting portion 603 and the intermediate portion 604 from opening with respect to the terminal connecting portion 602, the regulating portion 403 is preferably arranged at the end portion of the electrode connecting portion 603 on the minus side in the Y-axis direction or the intermediate portion 604 on the minus side in the Y-axis direction.

As described above, according to the energy storage device according to the present modification example, the same effect as that of the above-described embodiment can be obtained. In particular, the positive electrode lower gasket 400a includes the regulating portion 403 that regulates at least one of the electrode connecting portion 603 and the intermediate portion 604 of the positive electrode current collector 600 from moving away from the terminal connecting portion 602 in the first direction (Z-axis direction). In this way, by regulating at least one of the electrode connecting portion 603 and the intermediate portion 604 from moving away from the terminal connecting portion 602 in the first direction, it is possible to prevent the electrode assembly 700 from receding from the positive electrode terminal 200 in the first direction. In particular, since the positive electrode current collector 600 has a structure in which the plate-shaped member is bent at the connection part 605, the electrode connecting portion 603 and the intermediate portion 604 easily move in a direction away from the terminal connecting portion 602 by the springback caused by the connection part 605. Therefore, it is particularly significant to regulate at least one of the electrode connecting portion 603 and the intermediate portion 604 from moving away from the terminal connecting portion 602 by the regulating portion 403. As a result, since the electrode assembly 700 can be brought close to the positive electrode terminal 200 in the first direction, a larger electrode assembly 700 can be arranged, and the energy density can be improved.

The regulating portion 403 does not have to be a protrusion that engages with at least one of the electrode connecting portion 603 and the intermediate portion 604, and may be a fitting portion that fits with at least one of the electrode connecting portion 603 and the intermediate portion 604. The regulating portion 403 may be provided not on the positive electrode lower gasket 400a but on the terminal connecting portion 602, the lid 120, the swaged portion 201a, or the like. The regulating portion 403 may be an adhesive or double-sided tape, a joint for swaging joining, a fastening part for screwing fastening, a welding part for welding joining, a welded portion to be welded, or the like for bonding at least one of the electrode connecting portion 603 and the intermediate portion 604 to the terminal connecting portion 602, the positive electrode lower gasket 400a, or the like.

Second Modification Example

Figure 7:
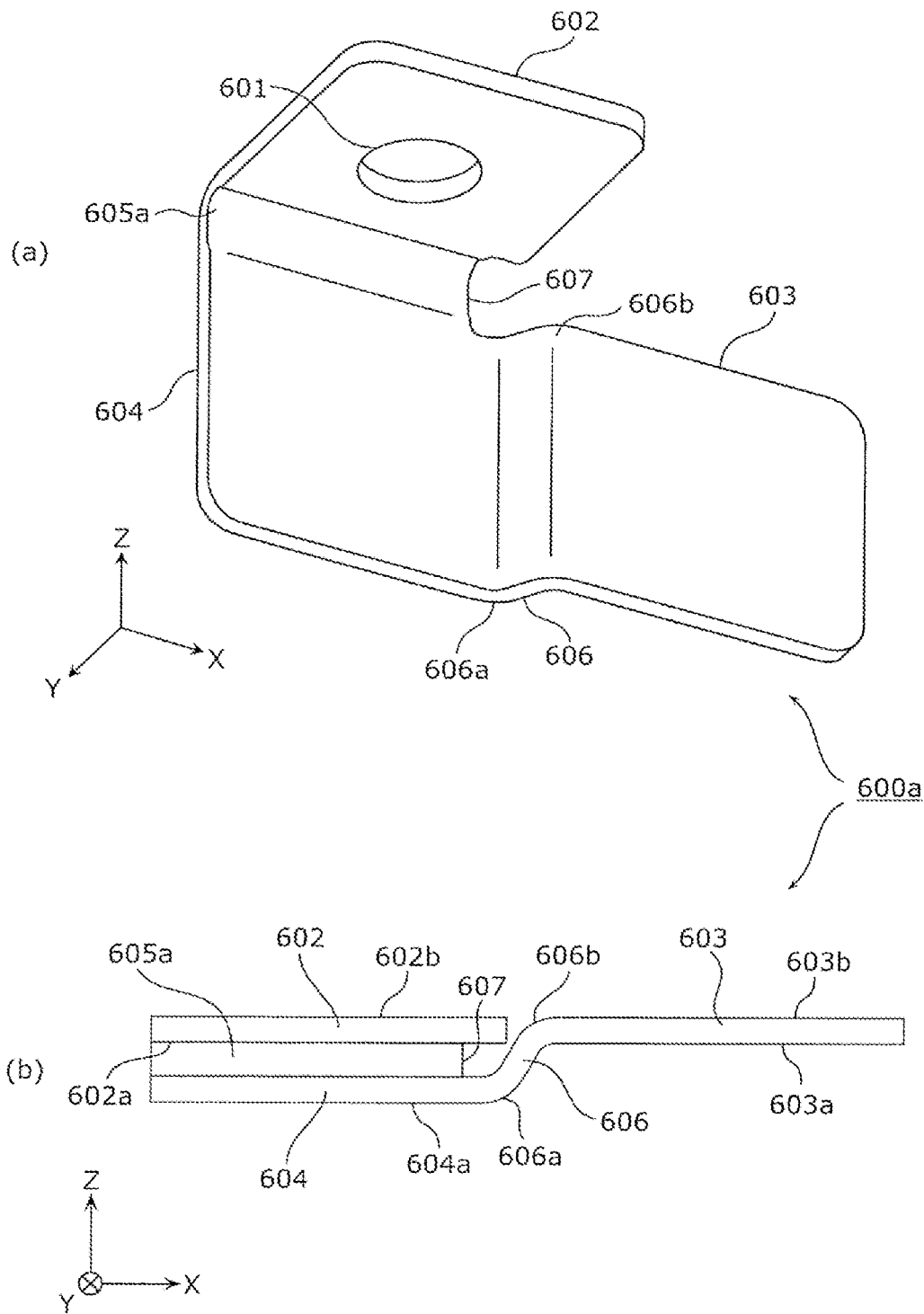
FIG. 7 is a perspective view and a front view showing a configuration of a positive electrode current collector according to a second modification example of the embodiment.

Next, a second modification example of the above embodiment will be described. FIG. 7 is a perspective view and a front view showing the configuration of a positive electrode current collector 600a according to the second modification example of the present embodiment. Specifically, (a) of FIG. 7 is a perspective view of a state in which the positive electrode current collector 600a is open, that is, a state as shown in (a) of FIG. 4 when viewed from diagonally below. (b) of FIG. 7 is a front view of a state in which the positive electrode current collector 600a is closed, that is, a state as shown in (b) of FIG. 4 when viewed from the front, and is a view corresponding to (b) of FIG. 3.

As shown in (a) of FIG. 7, the positive electrode current collector 600a in this modification example, unlike the positive electrode current collector 600 in the above embodiment, has a concave portion 607 that is recessed on the minus side in the X-axis direction formed at the connection point of the intermediate portion 604 with the terminal connecting portion 602. As a result, a connection part 605a in this modification example has a shorter length in the X-axis direction than the connection part 605 in the above embodiment. That is, in this modification example, the connection part 606 and the electrode connecting portion 603 are arranged closer to the minus side in the X-axis direction than in the above embodiment.

With such a configuration, the bent portions 606a and 606b of the connection part 606 are also arranged on the minus side in the X-axis direction, so that, as shown in (b) of FIG. 7, the bent portion 606a is arranged at a position overlapping the terminal connecting portion 602 when viewed in the Z-axis direction (first direction). The bent portions 606a and 606b are portions of the connection part 606 that are bent or curved from the intermediate portion 604 toward the electrode connecting portion 603. That is, the bent portion 606a is a curved portion of the connection part 606 on the minus side in the X-axis direction, and the bent portion 606b is a curved portion of the connection part 606 on the plus side in the X-axis direction. Other configurations are the same as those in the above embodiment.

As described above, according to the energy storage device according to the present modification example, the same effect as that of the above-described embodiment can be obtained. In particular, in the positive electrode current collector 600a, the intermediate portion 604 has the bent portion 606a at the connection part 606 with the electrode connecting portion 603, and the bent portion 606a is arranged at a position overlapping the terminal connecting portion 602. By overlapping the bent portion 606a of the intermediate portion 604 on the terminal connecting portion 602 in this way, the intermediate portion 604 has a shape that bends from the position of the terminal connecting portion 602, so that the size of the electrode connecting portion 603 can be increased. As a result, the electrode assembly 700 can be connected to the larger electrode connecting portion 603, so that the electrode assembly 700 and the positive electrode current collector 600 can be connected more stably. When the electrode connecting portion 603 is made to have the same size as that of the above embodiment in the present modification example, the positive electrode current collector 600a can be miniaturized, so that space can be saved.

In the present modification example, by arranging the electrode connecting portion 603 so as to move slightly to the minus side in the Z-axis direction and further to move to the minus side in the X-axis direction, it is possible to arrange the bent portion 606b also at a position overlapping the terminal connecting portion 602 when viewed in the Z-axis direction. The electrode connecting portion 603 can be further moved to the minus side in the X-axis direction until the electrode connecting portion 603 is arranged at a position overlapping the terminal connecting portion 602 when viewed in the Z-axis direction. Further, by slightly moving the intermediate portion 604 to the minus side in the Z-axis direction, it is possible to move the electrode connecting portion 603 to the minus side in the X-axis direction until the electrode connecting portion 603 is arranged at a position overlapping the intermediate portion 604 when viewed in the Z-axis direction. In these cases, since the electrode connecting portion 603 or the intermediate portion 604 moves slightly to the minus side in the Z-axis direction, the size of the electrode assembly 700 may be limited to some extent, but the size of the electrode connecting portion 603 can be further increased, or space in the X-axis direction can be further saved.

Other Modification Examples

Although the energy storage device according to the embodiment of the present invention and the modification examples thereof has been described above, the present invention is not limited to the embodiment and the modification examples thereof. That is, the embodiment and the modification examples thereof disclosed this time are exemplifications in all respects and are not restrictive, and the scope of the present invention is shown by the scope of claims, and all modifications within the meaning and scope equivalent to the claims are included. The positive electrode current collector will be described below, but the same applies also to the negative electrode current collector 610.

In the above embodiment and the modification examples thereof, the electrode connecting portion 603 of the positive electrode current collector 600, 600a is bent toward the terminal connecting portion 602 after being joined to the tab bundle 710 of the electrode assembly 700. However, the electrode connecting portion 603 may be joined to the tab bundle 710 in a bent state.

In the above embodiment and the modification examples thereof, the connection part 605, 605a of the intermediate portion 604 of the positive electrode current collector 600, 600a is connected to the end portion of the terminal connecting portion 602 on the plus side in the Y-axis direction. However, the connection part 605, 605a may be connected to the end portion on the minus side in the Y-axis direction or the end portion on the minus side in the X-axis direction of the terminal connecting portion 602. However, when the intermediate portion 604 is connected at the end portion of the terminal connecting portion 602 on the minus side in the X-axis direction, it may be difficult to connect the tab bundle 710 of the electrode assembly 700 to the electrode connecting portion 603 as described above. Therefore, the connection part 605, 605a is preferably connected to the end portion on the plus side in the Y-axis direction or the end portion on the minus side in the Y-axis direction of the terminal connecting portion 602.

In the above-described embodiment and the modification examples thereof, the intermediate portion 604 of the positive electrode current collector 600, 600a may be formed with a recess or a through hole in which the swaged portion 201a is arranged inward. As a result, the intermediate portion 604 can be brought close to the terminal connecting portion 602, so that a larger electrode assembly 700 can be arranged, and the energy density can be improved.

In the above-described embodiment and the modification examples thereof, the electrode assembly 700 is a stack-type electrode assembly in which a plurality of flat plate-shaped electrode plates is laminated. However, the shape of the electrode assembly 700 is not particularly limited, and the electrode assembly 700 may be a winding type electrode assembly formed by winding those arranged in layers so that a separator is sandwiched between the positive electrode plate and the negative electrode plate. The electrode assembly 700 may be a bellows type electrode assembly in which the electrode plate is folded in a bellows shape. The number of electrode assemblies 700 is not limited to one, and two or more electrode assemblies may be provided.

In the above embodiment and the modification examples thereof, both the positive electrode side (positive electrode current collector 600, 600a side) and the negative electrode side (negative electrode current collector 610 side) have the above configuration. However, the positive electrode side or the negative electrode side may not have the above configuration.

Forms which are constructed by arbitrarily combining the above embodiment and the modification examples are also included in the scope of the present invention.

The present invention can be realized not only as such an energy storage device, but also as a current collector (positive electrode current collector, negative electrode current collector) provided in the energy storage device, or as the current collector and the regulating portion 403.

INDUSTRIAL APPLICABILITY

The present invention can be applied to an energy storage device or the like such as a lithium ion secondary battery.

DESCRIPTION OF REFERENCE SIGNS

10: energy storage device
200: positive electrode terminal
201: shaft portion
201a: swaged portion
210: negative electrode terminal
400, 400a: positive electrode lower gasket
403: regulating portion
500: negative electrode lower gasket
600, 600a: positive electrode current collector
602: terminal connecting portion
602a: terminal connecting portion first surface
602b: terminal connecting portion second surface
603: electrode connecting portion
603a: electrode connecting portion first surface
603b: electrode connecting portion second surface
604: intermediate portion
604a: intermediate portion first surface
605, 605a, 606: connection part
606a, 606b: bent portion
610: negative electrode current collector
700: electrode assembly
710, 720: tab bundle

The invention claimed is:

1. An energy storage device comprising an electrode terminal, an electrode assembly, and a current collector connecting the electrode terminal and the electrode assembly, wherein
the current collector includes
a terminal connecting portion connected to the electrode terminal,
an electrode connecting portion connected to the electrode assembly in a first direction, and
an intermediate portion that connects the terminal connecting portion and the electrode connecting portion,
wherein the intermediate portion is arranged at a position overlapping the terminal connecting portion when viewed in the first direction, and
wherein the electrode connecting portion and the terminal connecting portion are arranged on one side of the intermediate portion in the first direction.

2. The energy storage device according to claim 1, wherein the electrode connecting portion is arranged at a position that does not overlap the terminal connecting portion when viewed in the first direction.

3. The energy storage device according to claim 1, wherein
the electrode connecting portion is arranged in a second direction intersecting with the first direction of the intermediate portion, and
the intermediate portion is connected to an end portion of the terminal connecting portion in a third direction intersecting with the first direction and the second direction.

4. The energy storage device according to claim 1, wherein
the intermediate portion includes a bent portion that is bent or curved toward the electrode connecting portion at a connection part with the electrode connecting portion, and
the bent portion is arranged at a position overlapping the terminal connecting portion when viewed in the first direction.

5. The energy storage device according to claim 1, further comprising
a regulating portion that regulates at least one of the electrode connecting portion and the intermediate portion from moving in a direction away from the terminal connecting portion in the first direction.

6. The energy storage device according to claim 1, wherein the intermediate portion physically connects the terminal connecting portion to the electrode connecting portion.

7. The energy storage device according to claim 1, wherein the intermediate portion directly connects the terminal connecting portion to the electrode connecting portion.

8. The energy storage device according to claim 1, wherein the terminal connecting portion is not physically connected to the electrode connecting portion.

9. The energy storage device according to claim 1, wherein the terminal connecting portion is not directly connected to the electrode connecting portion.

10. The energy storage device according to claim 1, wherein the intermediate portion includes a first surface positioned close to the electrode assembly and a second surface opposite to the first surface in the first direction, and wherein the one side is a direction toward the second surface from the first surface in the first direction.

11. The energy storage device according to claim 1, wherein the electrode connecting portion connected to the electrode assembly in the first direction, the first direction comprises an arrangement direction of the current collector and the electrode assembly.

12. A method for manufacturing an energy storage device including an electrode terminal, an electrode assembly, and a current collector connecting the electrode terminal and the electrode assembly, the current collector including
- a terminal connecting portion connected to the electrode terminal,
- an electrode connecting portion connected to the electrode assembly in a first direction, and
- an intermediate portion that connects the terminal connecting portion and the electrode connecting portion, the method for manufacturing the energy storage device comprising a bending step of bending the current collector so as to arrange the intermediate portion at a position overlapping the terminal connecting portion when viewed in the first direction, and arrange the electrode connecting portion and the terminal connecting portion on one side of the intermediate portion in the first direction.

13. The method for manufacturing the energy storage device according to claim 12, wherein in the bending step, the current collector is bent in two steps in an order of a first bending step and a second bending step, in the first bending step, the terminal connecting portion is brought close to the intermediate portion while supporting at least one of the electrode connecting portion and the intermediate portion from both sides in the first direction, and in the second bending step, the terminal connecting portion is brought closer to the intermediate portion while supporting at least one of the electrode connecting portion and the intermediate portion from a side opposite to the terminal connecting portion in the first direction.

14. The method for manufacturing the energy storage device according to claim 12, wherein the first direction comprises an arrangement direction of the current collector and the electrode assembly.

15. The method for manufacturing the energy storage device according to claim 12, wherein the intermediate portion physically connects the terminal connecting portion to the electrode connecting portion.

16. The method for manufacturing the energy storage device according to claim 12, wherein the intermediate portion directly connects the terminal connecting portion to the electrode connecting portion.

17. The method for manufacturing the energy storage device according to claim 12, wherein the terminal connecting portion is not physically connected to the electrode connecting portion.

18. The method for manufacturing the energy storage device according to claim 12, wherein the terminal connecting portion is not directly connected to the electrode connecting portion.

19. The method for manufacturing the energy storage device according to claim 12, wherein the intermediate portion includes a first surface positioned close to the electrode assembly and a second surface opposite to the first surface in the first direction, and wherein the one side is a direction toward the second surface from the first surface in the first direction.

20. The method for manufacturing the energy storage device according to claim 12, wherein from the bending step, the intermediate portion includes a bent portion that is bent or curved toward the electrode connecting portion at a connection part with the electrode connecting portion, and the bent portion is arranged at a position overlapping the terminal connecting portion when viewed in the first direction.

* * * * *